(12) United States Patent
Abeta

(10) Patent No.: US 8,798,686 B2
(45) Date of Patent: Aug. 5, 2014

(54) IN-VEHICLE APPARATUS HAVING HANDSFREE FUNCTION

(75) Inventor: Takehiro Abeta, Anjo (JP)

(73) Assignee: Denso Corporation, Kariya (JP)

( * ) Notice: Subject to any disclaimer, the term of this patent is extended or adjusted under 35 U.S.C. 154(b) by 832 days.

(21) Appl. No.: 12/592,779

(22) Filed: Dec. 2, 2009

(65) Prior Publication Data

US 2010/0144398 A1 Jun. 10, 2010

(30) Foreign Application Priority Data

Dec. 4, 2008 (JP) ................................. 2008-309651

(51) Int. Cl.
H04M 1/00 (2006.01)
H04M 3/00 (2006.01)
H04M 1/725 (2006.01)
H04M 1/60 (2006.01)

(52) U.S. Cl.
CPC ........ H04M 1/6075 (2013.01); H04M 1/72552 (2013.01); *H04M 2250/02* (2013.01)
USPC ...................... 455/569.1; 455/550.1; 455/418

(58) Field of Classification Search
USPC .................... 455/550.1, 567, 569, 569.2, 41.3
See application file for complete search history.

(56) References Cited

U.S. PATENT DOCUMENTS

| 2005/0003850 A1* | 1/2005 | Tsuda et al. ................ 455/550.1 |
| 2005/0070336 A1* | 3/2005 | Tamura .......................... 455/567 |
| 2006/0052141 A1 | 3/2006 | Suzuki | |

FOREIGN PATENT DOCUMENTS

| JP | 10-164204 | 6/1998 |
| JP | 2002-185601 | 6/2002 |
| JP | 2003-008700 | 1/2003 |
| JP | 2003-256341 | 9/2003 |
| JP | 2006-080617 | 3/2006 |
| JP | 2007-096990 | 4/2007 |
| JP | 2007-129605 | 5/2007 |
| JP | 2008-271255 | 11/2008 |

OTHER PUBLICATIONS

Office action dated Oct. 26, 2010 in corresponding Japanese Application No. 2008-309651 15773038.1.

* cited by examiner

Primary Examiner — Kent Chang
Assistant Examiner — Kuo Woo
(74) Attorney, Agent, or Firm — Harness, Dickey & Pierce, PLC

(57) ABSTRACT

An in-vehicle handsfree apparatus stores a mail operation state while a message access profile (MAP) is being connected with a cellular phone. An incoming voice call from a communication network arises in the cellular phone while the in-vehicle handsfree apparatus is receiving mail information from the cellular phone. When the cellular phone answers the incoming voice call, the MAP is disconnected from the cellular phone. After completing the handsfree call relative to the incoming voice call, the reception of the mail information is resumed from the state just before the MAP was once disconnected.

3 Claims, 3 Drawing Sheets

IN-VEHICLE APPARATUS HAVING HANDSFREE FUNCTION

CROSS REFERENCE TO RELATED APPLICATION

The present application is based on and incorporates herein by reference Japanese Patent Application No. 2008-309651 filed on Dec. 4, 2008.

FIELD OF THE INVENTION

The present invention relates to an in-vehicle apparatus which establishes a concurrent connection with a cellular phone with respect to a handsfree call protocol and a data transfer protocol.

BACKGROUND OF THE INVENTION

[Patent document 1] JP-2003-256341 A

There is a case that a cellular phone having the Bluetooth (registered trademark, referred to as BT) communication function is brought into a compartment of a vehicle equipped with an in-vehicle apparatus which also has the Bluetooth communication function. When the in-vehicle apparatus and cellular phone come to be in the state where the BT communication is possible, the cellular phone transmits mail information (e-mail transmission source, date and time of mail arrival, e-mail subject name; mail text, etc.) to the in-vehicle apparatus. The in-vehicle apparatus thus displays the mail information received from the cellular phone. Such a configuration is disclosed, for example, in Patent document 1.

Incidentally, in order to forward an e-mail from a cellular phone to an in-vehicle apparatus, a method for connecting therebetween a Message Access Profile (MAP) defined by the telecommunications standard of the BT is studied.
An incoming voice call may arise in the cellular phone while a user reads out mail information stored in the cellular phone and display it in a display section of the in-vehicle apparatus. In such a case, the in-vehicle apparatus interrupts the operation of reading out of the mail information from the cellular phone, notifying the user of the incoming voice call arising. Further, the in-vehicle apparatus prepares touch switches such as a response switch or a response refusal switch for the user to answer the incoming voice call or to refuse to answer the incoming voice call.

However, some models of cellular phones break down the connection of the MAP, which has been connected until then, when the user answers the incoming voice call by operating the response switch. In such a case, for the user to resume the operation for reading out the mail information from the cellular phone after completing the handsfree call, it is necessary to execute an operation to re-connect the MAP, which was once disconnected. This poses a disadvantage in operability.

SUMMARY OF THE INVENTION

The present invention is made in view of the above situation.
It is an object to provide an in-vehicle apparatus having a handsfree function and provided with the following. Even when, under concurrent connection being established with a cellular phone with respect to a handsfree call protocol and a data transfer protocol, the data transfer protocol is once disconnected because of an operation of the cellular phone, the in-vehicle apparatus can address a disadvantage due to the disconnection of the data transfer protocol appropriately, thus improving the user's operability.

To achieve the above object, according to an example of the present invention, an in-vehicle apparatus having a handsfree function is provided as follows. A connecting section is configured to establish a concurrent connection of a handsfree call protocol and a data transfer protocol, the handsfree call protocol being for a handsfree call with a cellular phone, the data transfer protocol being for a data transfer with the cellular phone. A storing section is configured to store a data transfer state when the connection of the data transfer protocol with the cellular phone is being established by the connecting section. A control circuit is configured to (i) store an interrupt event, which indicates that the connection of the data transfer protocol becomes interrupted at a time during the data transfer, by determining the data transfer state, which is stored by the storing section, in case that an operation in the cellular phone causes an interruption of the connection of the data transfer protocol, which was connected under the concurrent connection with the cellular phone established by the connecting section with respect to the handsfree call protocol and the data transfer protocol, (ii) establish a re-connection of the data transfer protocol when a predetermined condition is satisfied, and (iii) resume the date transfer from a just-prior-interrupt data transfer state, which corresponds to a data transfer state just before the connection of the data transfer protocol was interrupted.

According to another example of the present invention, a method is provided for resuming a data transfer in an in-vehicle apparatus having a handsfree function with a cellular phone. The method comprises: (i) establishing a concurrent connection of a handsfree call protocol and a data transfer protocol, the handsfree call protocol being for a handsfree call with a cellular phone, the data transfer protocol being for a data transfer with the cellular phone; (ii) storing a data transfer state when the connection of the data transfer protocol with the cellular phone is being established; (iii) storing an interrupt event, which indicates that the connection of the data transfer protocol becomes interrupted in a mid process of the data transfer, by determining the stored data transfer state, in case that an operation in the cellular phone causes an interruption of the connection of the data transfer protocol, which was connected under the concurrent connection with the cellular phone with respect to the handsfree call protocol and the data transfer protocol; (iv) establishing a re-connection of the data transfer protocol when a predetermined condition is satisfied; and (v) resuming the date transfer from a just-prior-interrupt data transfer state, which corresponds to a data transfer state just before the connection of the data transfer protocol was interrupted.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
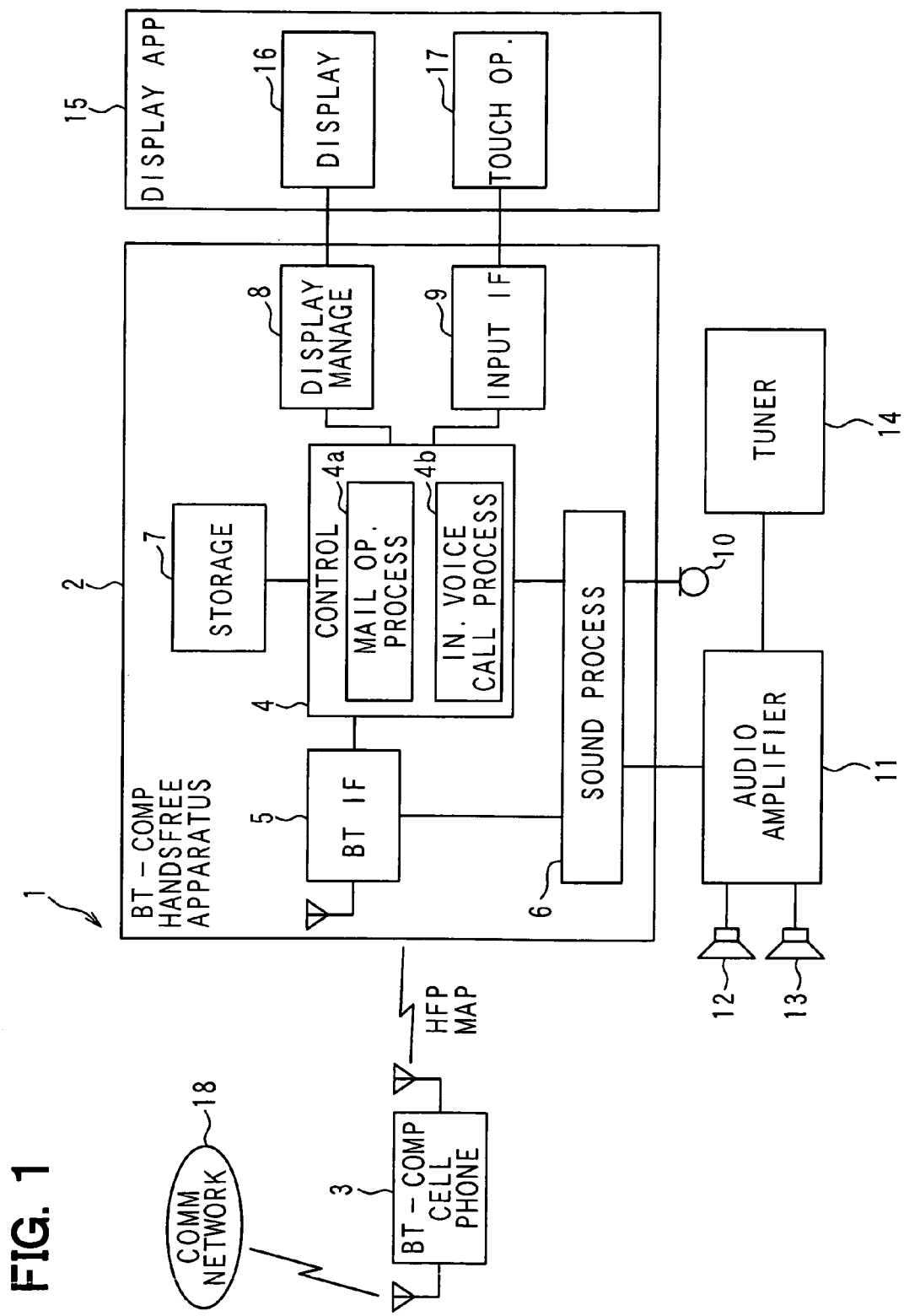
FIG. 1 is a functional block diagram according to an embodiment of the present invention.

An embodiment according to the present invention will be explained with reference to drawings. First, a "Bluetooth" is a trade mark and referred to as BT. An in-vehicle handsfree apparatus having a BT communication function (also referred to as BT-compliant) is mounted in a subject vehicle. The following explains a case that a cellular phone also having the BT communication function is brought into a passenger compartment of the subject vehicle and becomes able to communicate with the in-vehicle BT-compliant handsfree apparatus.

The in-vehicle handsfree apparatus 2 and the cellular phone 3 are included in an in-vehicle handsfree system 1. The in-vehicle handsfree apparatus 2 includes the following: a control circuit 4 (also called as a control section or a control means), a BT interface (IF) section 5 (also called a connecting means or section), a call sound processing section 6, a storage section 7 (also called a storing means or section, or a data transfer state storing means or section), a display management section (also called as a display management means or section) 8, and an touch operation input interface section 9.

The control circuit 4 includes a known micro-computer having a CPU, RAM, ROM, I/O bus, etc., and controls an overall operation of the in-vehicle handsfree apparatus 2 such as a communication operation, and a data management operation. The BT interface section 5 has a function to execute a BT communication with the cellular phones 3. The telecommunications standard of BT defines a HandsFree Profile (HFP) (also referred to as a handsfree call protocol) for realizing a handsfree (telephone) call and a Message Access Profile (MAP) (also referred to as a data transfer protocol, or a mail transfer protocol) for realizing a mail transfer. The BT interface section 5 is compliant with the HFP and the MAP and, further is configured to be able to connect (or establish a connection of) both of the HFP and MAP at the same time (so-called multiple connection or concurrent connection). Further, it is noted that "connection" naturally means "communication connection." Further, it is noted that a mail is defined as a general term such as a character (or text) message or image data. Moreover, the BT interface section 5 is compliant with a Phone Book Access Profile (PBAP) for realizing a transfer of phone book data, outgoing call history data, or incoming call history data, or an Object Push Profile (OPP) for realizing the various data transfers, in addition to the HFP and MAP. Herein, the above profiles signify communication protocols defined for every function.

The call sound processing section 6 is connected with a microphone 10 and an audio amplifier 11. The microphone 10 is arranged at a position to easily collect user's utterance. The audio amplifier 11 is arranged outside of the in-vehicle handsfree apparatus 2 and connected with two speakers 12, 13. The speaker 12 and the speaker 13 are arranged symmetrically with respect to the full length direction of the vehicle mounted with the present in-vehicle handsfree apparatus 2. The speaker 12 is arranged for example, at a driver's seat door; the speaker 13 is arranged for example, at a passenger seat door. In addition, the audio amplifier 11 is also connected to a tuner deck 14. For instance, the tuner deck 14 receives a musical tune sound from a storage medium for music, or a radio program from a radio station and outputs them to the audio amplifier 11. The audio amplifier 11 amplifies the received musical tune sound and the radio program and outputs the amplified sounds via the speakers 12, 13.

The storage section 7 stores the following various data, for example: phone book data indicating correspondence between telephone numbers, e-mail addresses, and registration names; historical outgoing call data indicating correspondence between outgoing call clock times and destination phone numbers with respect to outgoing calls from the in-vehicle handsfree apparatus 2 or cellular phone 3 with which the HFP is connected; historical incoming call data indicating correspondence between incoming call clock times and source phone numbers with respect to incoming calls to the cellular phone 3 with which the in-vehicle handsfree apparatus 2 establishes the HFP connection.

A display apparatus 15 includes a display (screen) section 16 for displaying display windows, and a touch operation input section (i.e., touch sensitive panel) 17 forming a touch switch on the display window. A display management section 8 controls a display window operation of the display section 16 in the display apparatus 15 based on a display command notice (also referred to signal), which is received from the control circuit 4. It is noted that the display management section 8 may be incorporated into the control circuit 4 as needed, naturally. The touch operation input interface section 9 receives an operation detection notice (also referred to as signal) via the touch operation input section 17 according to the user having operated the touch switch presently formed on the display window. The input interface section 9 outputs the received operation detection notice to the control circuit 4. The control circuit 4 processes the received operation detection notice by analyzing it.

In such a case, as the user executes a mail operation via the touch operation input section 17, the control circuit 4 stores a mail operation state, which is a state of the mail operation, in the storage section 7. The mail operation includes an individual display operation to individually display a single mail from the multiple mails, or a list display operation to collectively display several mails at the same time in a list. The control circuit 4 transmits, to the cellular phone 3, a read-out instruction notice (also referred to as signal) for analyzing a mail operation and reading out relative mail information via the BT interface section 5; thereby, the control circuit 4 receives via the BT interface section 5 the mail information transmitted from the cellular phone 3 and displays it in the display section 16.

The cellular phone 3 includes the following: a control circuit to control an overall operation of the cellular phone 3; a telephone communication section to execute a telephone communication with a communication network 18; a BT interface section to execute a BT communication; a key input section arranging the various keys which the user operates; a storage section to store the various data such as phone book data indicating correspondence between telephone numbers, e-mail addresses, and registration names, and mail information containing e-mail transmission sources, dates and times of mail arrivals, e-mail subject names, and mail texts; and a display section to displays the various display windows; a microphone to input a sound which the user utters; and a speaker which outputs as a reception sound a sound received from a call partner. It is noted that the BT interface section of the cellular phone 3 has a function to execute the BT communication with the in-vehicle handsfree apparatus 2 while complying with the HFP and the MAP like the BT interface section 5 of the in-vehicle handsfree apparatus 2. The cellular phone 3 can connect the HFP and MAP at the same time with the in-vehicle handsfree apparatus 2 (i.e., can establish a concurrent connection or multiple connection of the HFP and MAP).

The following explains a case that when the in-vehicle handsfree apparatus 2 and the cellular phone 3 connect the HFP (i.e., establish the HFP connection) with each other, an incoming voice call from the communication network 18 to the cellular phone 3 occurs (i.e., a voice call comes to the cellular phone 3 via the communication network 18). It is noted that the communication network 18 includes a facility, which provides a known cellular phone communication service, such as a wireless base station, a base station control apparatus.

When detecting that an incoming voice call occurs under the condition that the HFP is connected with the in-vehicle handsfree apparatus 2, the cellular phone 3 transmits an incoming voice call notice (also called as a signal or message), which indicates the reception of an incoming voice call, to the in-vehicle handsfree apparatus 2. In this case, the cellular phone 3 transmits the incoming voice call notice containing own identification information (for example, telephone number, which is registered inside), which identifies the cellular phone 3, to the in-vehicle handsfree apparatus 1. If a call source telephone number serving as a call partner is obtained via the communication network 18, the incoming voice call notice also containing the received call source telephone number is transmitted to the in-vehicle handsfree apparatus 2. Moreover, if the cellular phone 3 is compliant with an inbound ring tone, the cellular phone 3 also transmits the voice incoming call notice sound registered inside to the in-vehicle handsfree apparatus 2.

In the in-vehicle handsfree apparatus 2, when receiving the incoming voice call notice via the BT interface section 5 from the cellular phone 3, the control circuit 4 operates as follows. If the incoming voice call notice sound is not received from the cellular phone 3, the incoming voice call notice sound registered internally in the in-vehicle handsfree apparatus 2 is outputted via the speakers 12 and 13; the user is thus notified that the cellular phone 3 has received an incoming voice call. If the caller telephone number (i.e., source telephone number) is received from the cellular phone 3, the received voice incoming call notice sound (incoming voice call notice sound registered in the cellular phone 3) is outputted via the speakers 12 and 13. Moreover, the control circuit 4 displays an incoming voice call notice display window for indicating in the display section 16 that the cellular phone 3 is receiving an incoming voice call.

Thereby, the user hears the incoming voice call notice sound outputted via the speakers 12 and 13, or sees the incoming voice call notice display window in the display section 16, thus recognizing that the incoming voice call is arriving at the cellular phone 3. When the user recognizes that the cellular phone 3 is receiving an incoming voice call, the user operates the in-vehicle handsfree apparatus 2 or the cellular phone 3. By operating the in-vehicle handsfree apparatus 2, the user can select to either answer the incoming voice call reaching the cellular phone 3 through a handsfree call (i.e., a handsfree telephone call) or refuse to answer the incoming voice call. In contrast, by operating the cellular phone 3, the use can select to either answer the incoming voice call reaching the cellular phone 3 through a private call (i.e., a handset call) or refuse to answer the incoming voice call. It is noted that the handsfree call is to establish a voice path between the cellular phone 3 and the in-vehicle handsfree apparatus 2 to allow a voice or speech to be exchanged therebetween to thereby allow a telephone call using the microphone 10 and speakers 12, or 13 of the in-vehicle handsfree apparatus 2. In contrast, the private telephone call is to have a telephone call using a microphone and speaker of the cellular phone 3 by closing a voice path between the cellular phone 3 and the in-vehicle handsfree apparatus 2 to stop exchanging the voice or speech therebetween.

Under the above configuration of the present embodiment, the followings take place. When the in-vehicle handsfree apparatus 2 and the cellular phone 3 are connecting the MAP with each other, an incoming voice call from the communication network 18 to the cellular phone 3 occurs (i.e., a voice call comes to the cellular phone 3 via the communication network 18). When the user executes, to the in-vehicle handsfree apparatus 2, an operation or manipulation, which answers the incoming voice call reaching the cellular phone 3 using the handsfree call, the in-vehicle handsfree apparatus 2 transmits a response notice to the cellular phone 3. When receiving the response notice from the in-vehicle handsfree apparatus 2, the cellular phone 3 operates to answer the incoming voice call. In such a case, the cellular phone 3 is designed to once disconnect (i.e., interrupt a communication connection of) the MAP, which has been connected with the in-vehicle handsfree apparatus 2.

Figure 2:
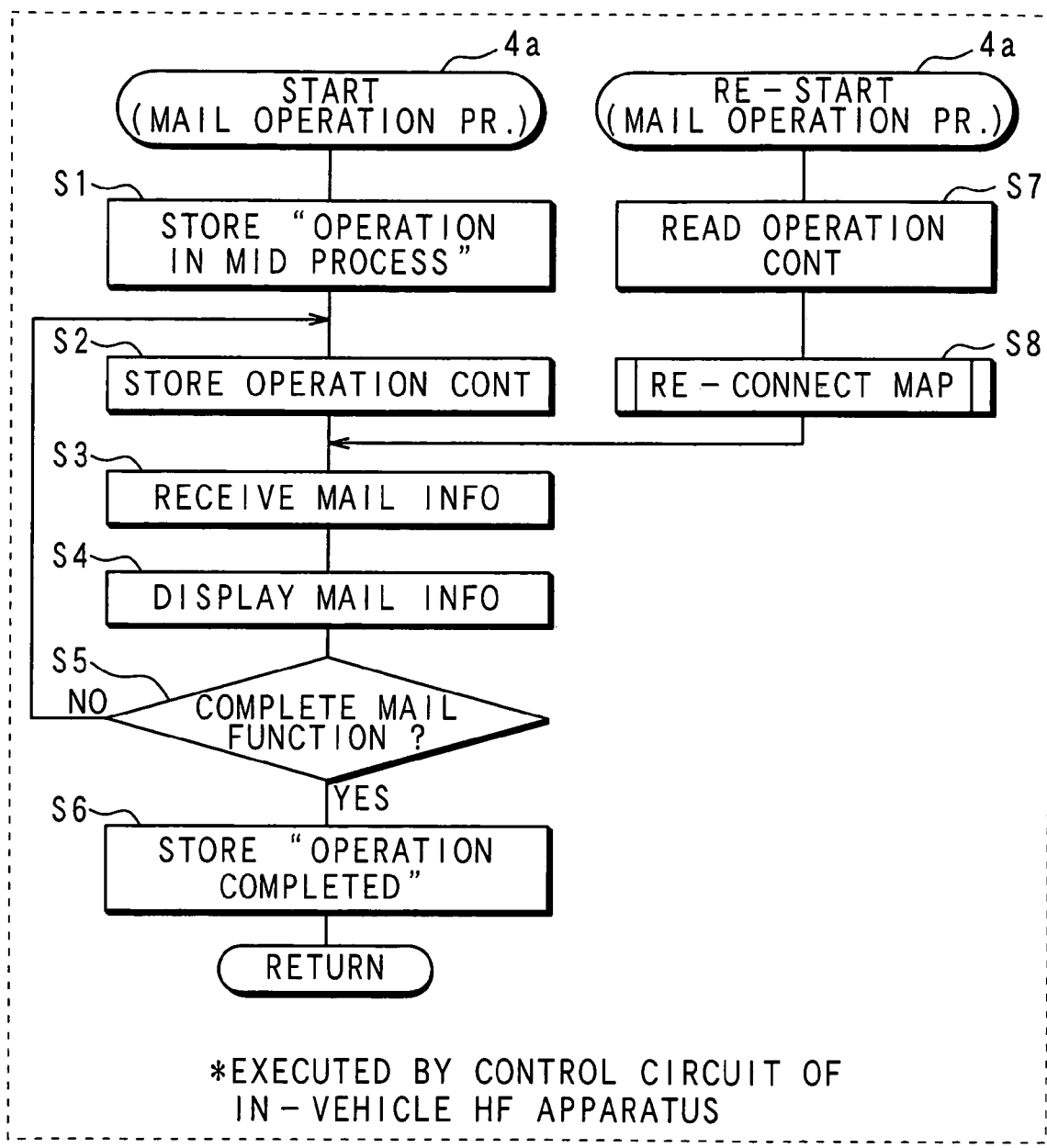
FIG. 2 is a flowchart of a mail operation process (part 1)
Figure 3:
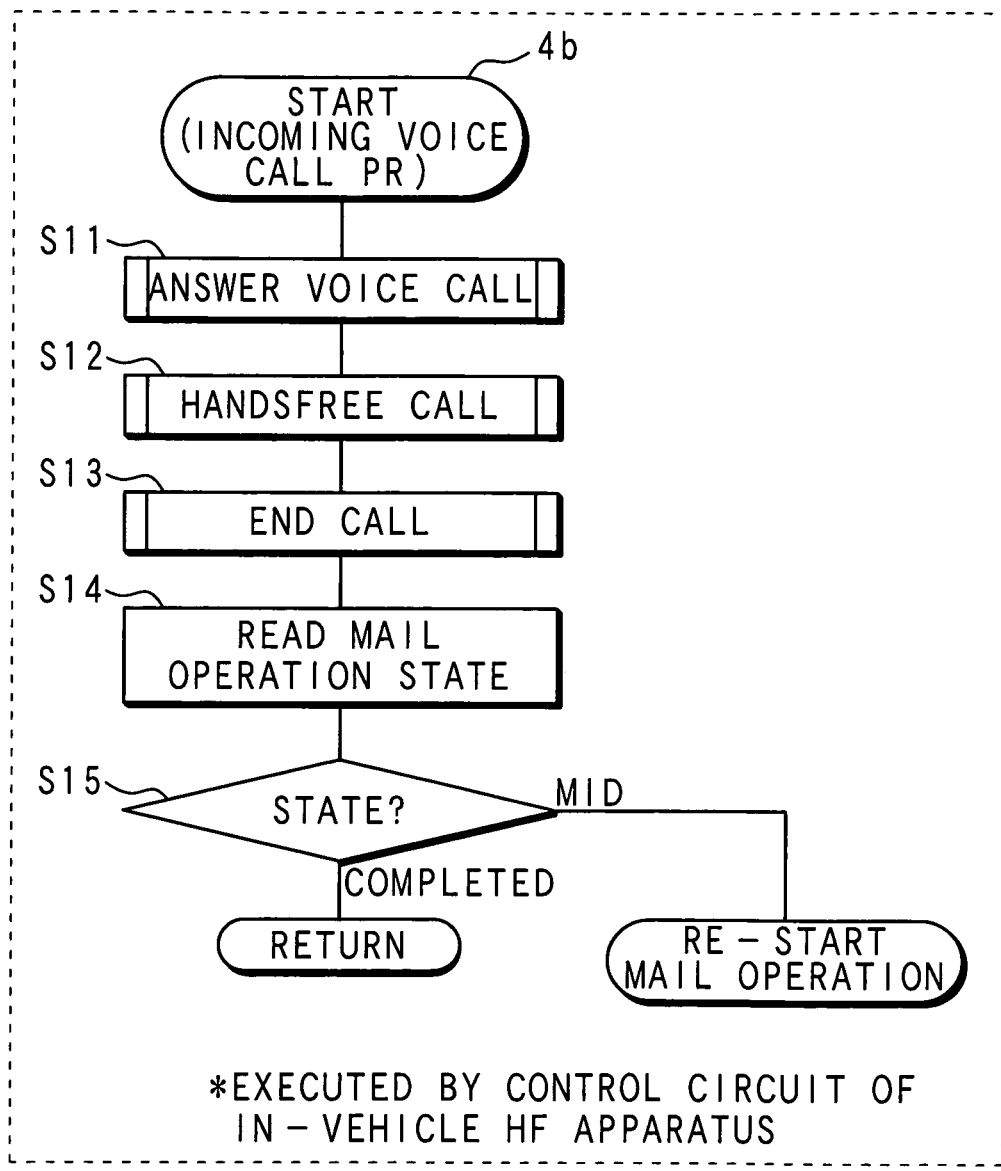
FIG. 3 is a flowchart of an incoming voice call process (part 2).

An operation under the above configuration is explained with reference to FIGS. 2 and 3. FIGS. 2, 3 illustrate flowcharts of a mail operation process 4a and an incoming voice call process 4b, respectively, executed by the control circuit 4 of the in-vehicle handsfree apparatus 2. In the in-vehicle handsfree apparatus 2, the control circuit 4 operates as follows. When detecting that the user operates for starting (activating) a mail function via the touch operation input section 17, the control circuit 4 starts a mail operation process. The mail operation state is stored as "operation in a mid process (i.e., under operation)" in the storage section 7 at S1 ("S" represents Section or Step of the subject process). The user's operation content (also referred to as an operation item or operation information) is stored in the storage section 7 at S2. That is, whenever the user performs an operation to browse mails via the touch operation input section 17, the control circuit 4 stores the contents or items of the operations in a time-based (chronological) order in the storage section 7.

Subsequently, the control circuit 4 transmits to the cellular phone 3 a read-out instruction notice (referred to as a signal or message) for reading out relevant mail information based on the user's operation contents, thereby receiving the mail information from the cellular phone 3 at S3. The mail information received from the cellular phone 3 is displayed in the display section 16 at S4. The control circuit 4 then determines whether or not to complete the mail function at S5. When detecting that the user performs an operation for ending (i.e., completing) the mail function via the touch operation input section 17, the control circuit 4 determines the completion of the mail function, which corresponds to "YES" at S5. The mail operation state is then stored as "operation completed" in the storage section 7 at S6. The mail operation process is ended, thereby causing the processing to return.

Moreover, as an incoming voice call from the communication network 18 to the cellular phone 3 occurs, the control circuit 4 receives an incoming voice call notice from the cellular phone 3 to thereby detect the incoming voice call arising to the cellular phone 3, starting an incoming voice call process in FIG. 3. When detecting that the user performs a response operation for answering the incoming voice call, the control circuit 4 executes an incoming voice call response process, which answers the incoming voice call, at S11. At this time, it is supposed that the MAP is being connected between the in-vehicle handsfree apparatus 2 and the cellular phone 3. When the cellular phone 3 receives the response notice transmitted from the in-vehicle handsfree apparatus 2 to thereby answer the incoming voice call, the cellular phone 3 once disconnects (i.e., interrupts the connection of) the MAP, which has been connected with the in-vehicle handsfree apparatus 2 until then.

Subsequently, the control circuit 4 answers the incoming voice call to thereby perform a handsfree call process at S12. That is, the BT interface section 5 is caused to transmit to the cellular phone 3 a voice sound inputted via the microphone 10 and the cellular phone 3 is caused to transmit the received voice sound to the communication network 18 as a transmission voice sound. In contrast, the BT interface section 5 is caused to receive the voice sound received by the cellular phone 3 via the communication network 18 and the speakers 12 and 13 are caused to output the received voice sound as a reception voice sound. After completing the handsfree call process, the control circuit 4 executes a call end process for completing or ending the handsfree call at S13. The control circuit 4 reads out the mail operation state presently stored in the storage section 7 and determines the read mail operation state at S14. When the control circuit 4 determines that the mail operation state presently stored in the storage section 7 is "operation completed," the incoming voice call process is ended; thus, the processing returns. In contrast, when the control circuit 4 determines that the mail operation state presently stored in the storage section 7 is "operation in mid process, "the processing advances to a mail operation re-start process, i.e., resumes the mail operation in FIG. 2.

As the control circuit 4 re-starts or resumes the mail operation (i.e., re-starts a mail operation process), the user's operation content presently stored in the storage section 7 is read out at S7. It is noted that the MAP is presently disconnected between the in-vehicle handsfree apparatus 2 and the cellular phone 3 when and after starting the incoming voice call process. Thus, at S8, the control circuit 4 establishes a re-connection of (i.e., re-connects) the MAP, which has been disconnected between the in-vehicle handsfree apparatus 2 and the cellular phone 3. At S3 in FIG. 2, the control circuit 4 re-starts, according to the operation content read from the storage section 7, the reception of the mail information from the state just before the MAP was disconnected. Then, the processing repeats the above-mentioned S4 and subsequent sections or steps in FIG. 2.

The present embodiment explains the case where the cellular phone 3 once disconnects (or interrupt a connection of) the MAP, which has been connected with the in-vehicle handsfree apparatus 2, by answering an incoming voice call reaching the cellular phone 3. The condition to once disconnect the MAP is differentiated depending on the model or type of the cellular phone 3. If the mail operation state is stored while the MAP is being connected with the cellular phones 3, any event can be addressed regardless of the conditions where the MAP is disconnected by the cellular phone 3. Moreover, the condition where the re-connection of the MAP, which was once disconnected, is not restricted to the case where the handsfree call is completed.

As the explained above, the in-vehicle handsfree apparatus 2 according to the present embodiment is provided as follows. A mail operation state is stored while connecting the MAP (Message Access Profile) with the cellular phones 3. An incoming voice call arises from the communication network 18 to the cellular phone 3 while receiving mail information from the cellular phone 3. Because of the cellular phone 3 answering the incoming voice call, the connection of the MAP with the cellular phone 3 is once interrupted or broken down. After completing the handsfree call, re-connection of the MAP is established. The reception of the mail information is resumed from the state just before the connection of the MAP was interrupted (i.e., the MAP was disconnected). Thus, the user is not required to execute any operation or manipulation for re-connecting the MAP, which can improve the user's operability. Further, only the untransmitted mail data can be transmitted after re-connecting the MAP, efficiently transmitting the mail information.

The present invention is not limited only to the above-mentioned embodiment, and can be modified or extended as follows. The function of the in-vehicle handsfree apparatus 2 may be included in another in-vehicle apparatus, such as an in-vehicle navigation apparatus. There is no need to be limited to have only the configuration in which mail information is transmitted to the in-vehicle handsfree apparatus from the cellular phone. For instance, a configuration may be provided which includes a cellular phone and an in-vehicle handsfree apparatus, both of which connect an Object Push Profile therebetween, for transmitting, from the cellular phone to the in-vehicle handsfree apparatus, image data, music composition data, etc. While connecting the OPP with the cellular phone, the transfer state of the image data, the music composition data, etc., may be stored. An incoming voice call may arise from the communication network to the cellular phone while receiving the image data or composition data from the cellular phone. Because of the cellular phone answering the incoming voice call, the connection of the OPP with the cellular phone may be once interrupted or broken down (i.e., the OPP is disconnected). After completing the handsfree call relative to the incoming voice call, the reception of the image data or music composition data may be resumed from the reception state just before disconnecting the OPP in a mid process.

Each or any combination of processes, steps, sections, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a micro-computer.

Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As an aspect of the disclosure, an in-vehicle apparatus having a handsfree function is provided as follows. A connecting section is configured to establish a concurrent connection of a handsfree call protocol and a data transfer protocol, the handsfree call protocol being for a handsfree call with a cellular phone, the data transfer protocol being for a data transfer with the cellular phone. A storing section is configured to store a data transfer state when the connection of the data transfer protocol with the cellular phone is being established by the connecting section. A control circuit is configured to (i) store an interrupt event, which indicates that the connection of the data transfer protocol becomes interrupted at a time during the data transfer, by determining the data transfer state, which is stored by the storing section, in case that an operation in the cellular phone causes an interruption of the connection of the data transfer protocol, which was connected under the concurrent connection with the cellular phone established by the connecting section with respect to the handsfree call protocol and the data transfer protocol, (ii) establish a re-connection of the data transfer protocol when a predetermined condition is satisfied, and (iii) resume the date transfer from a just-prior-interrupt data transfer state, which corresponds to a data transfer state just before the connection of the data transfer protocol was interrupted.

For instance, suppose the case that (i) a concurrent connection of the handsfree call protocol and the data transfer protocol is established with a cellular phone, (ii) a data transfer is thus executed, and (iii) during executing the data transfer (i.e., at a time during the data transfer, or in a mid process of the data transfer), the data transfer protocol is disconnected because of an operation of the cellular phone (e.g., answering an incoming voice call). Even in such a case, without need of an operation to re-connect the data transfer protocol, which was once disconnected, when a condition to allow the re-connection of the data transfer protocol (for example, a condition of completion of the voice call) is satisfied, the data transfer protocol, which has been disconnected till then, can be re-connected and the data transfer can be resumed from the data transfer state just before the data transfer was once disconnected. Thus, the user is not required to execute an operation to re-connect the data transfer protocol, which was once disconnected, which enhances the user's operability. Further, only the untransmitted data can be transmitted after re-connecting of the data transfer protocol, enabling the data to be efficiently transmitted.

As an optional aspect of the in-vehicle apparatus, the connecting section may be further configured to establish, as the connection of the data transfer protocol, a connection of a mail transfer protocol for a mail transfer with the cellular phone to thereby establish the concurrent connection of the handsfree call protocol and the mail transfer protocol. The storing section may be further configured to store a mail transfer state when the connection of the mail transfer protocol with the cellular phone is being established by the connecting section. The control circuit may be further configured to (i) store an interrupt event, which indicates that the connection of the mail transfer protocol becomes interrupted at a time during the mail transfer, by determining the mail transfer state, which is stored by the storing section, in case that an operation in the cellular phone causes an interruption of the connection of the mail transfer protocol, which was connected under the concurrent connection with the cellular phone established by the connecting section with respect to the handsfree call protocol and the mail transfer protocol, (ii) establish a re-connection of the mail transfer protocol when a predetermined condition is satisfied, and (iii) resume the mail transfer from a just-prior-interrupt mail transfer state, which corresponds to a mail transfer state just before the connection of the mail transfer protocol was interrupted.

For instance, suppose the case that (i) a concurrent connection with a cellular phone is established with respect to the handsfree call protocol and the mail transfer protocol, (ii) a mail transfer is thus executed, and (iii) during executing the mail transfer, the mail transfer protocol is disconnected because of an operation of the cellular phone. Even in such a case, without need of an operation to re-connect the mail transfer protocol, which was once disconnected, when a condition for allowing the re-connection of the mail transfer is satisfied, the mail transfer protocol, which has been disconnected till then, can be re-connected and the mail transfer can be resumed from the mail transfer state just before the mail transfer was once disconnected. The user is not required to execute an operation to re-connect the mail transfer protocol, which was once disconnected, which enhances the user's operability. Only the untransmitted mail data can be transmitted after re-connecting the mail transfer protocol, allowing the efficient transmission of the mail data.

As an optional aspect of the in-vehicle apparatus, the operation in the cellular phone causing the interruption of the data transfer protocol may be an operation for answering an incoming voice call reaching the cellular phone to thereby start the voice call using the handsfree call with the cellular phone; and the predetermined condition may be satisfied when the voice call is completed.

As an optional aspect of the in-vehicle apparatus, the storing section may be further configured to store in a time-based order operation contents of a user with respect to the data transfer; and the control circuit may be further configured to resume the date transfer from the just-prior-interrupt data transfer state with reference to both of the data transfer state and the operation contents of the user, the both being stored in the storing section.

As another aspect of the disclosure, a method is provided for resuming a data transfer in an in-vehicle apparatus having a handsfree function with a cellular phone. The method comprises: (i) establishing a concurrent connection of a handsfree call protocol and a data transfer protocol, the handsfree call protocol being for a handsfree call with a cellular phone, the data transfer protocol being for a data transfer with the cellular phone; (ii) storing a data transfer state when the connection of the data transfer protocol with the cellular phone is being established; (iii) storing an interrupt event, which indicates that the connection of the data transfer protocol becomes interrupted in a mid process of the data transfer, by determining the stored data transfer state, in case that an operation in the cellular phone causes an interruption of the connection of the data transfer protocol, which was connected under the concurrent connection with the cellular phone with respect to the handsfree call protocol and the data transfer protocol; (iv) establishing a re-connection of the data transfer protocol when a predetermined condition is satisfied; and (v) resuming the date transfer from a just-prior-interrupt data transfer state, which corresponds to a data transfer state just before the connection of the data transfer protocol was interrupted.

It will be obvious to those skilled in the art that various changes may be made in the above-described embodiments of the present invention. However, the scope of the present invention should be determined by the following claims.

What is claimed:

1. An in-vehicle apparatus having a handsfree function, the apparatus comprising:
    an operation input section configured to receive an operation input from a user;
    a connecting section configured to establish a concurrent connection of a handsfree call protocol for a handsfree call and a mail transfer protocol for a mail transfer with a cellular phone;
    a storing section storing a mail transfer state presently taking place as a present mail transfer state out of a plurality of mail transfer states in performing a mail browse under the concurrent connection of the mail transfer protocol and the handsfree call protocol with the cellular phone, the plurality of mail transfer states being changed based on input operations to the operation input section from the user;
    a control circuit configured to
        store an interrupt event at a time during the mail transfer by determining the present mail transfer state in the storing section, in case that an operation in the cellular phone causes an interruption of the connection of the mail transfer protocol under the concurrent connection of the handsfree call protocol and the mail transfer protocol with the cellular phone, the interrupt event indicating that the connection of the mail transfer protocol becomes interrupted at the time during the mail transfer,
        establish a re-connection of the mail transfer protocol in case that a predetermined condition is satisfied when the interrupt event is stored, and
        resume the mail transfer from a just-prior-interrupt data transfer state of the plurality of mail transfer states, the just-prior-interrupt data transfer state being the present mail transfer state stored in the storing section when the re-connection of the mail transfer protocol is established.

2. The in-vehicle apparatus according to claim 1, wherein:

the operation in the cellular phone causing the interruption of the mail transfer protocol is an operation for answering an incoming voice call reaching the cellular phone to start the voice call using the handsfree call with the cellular phone; and the predetermined condition is satisfied when the voice call is completed, so that the re-connection of the mail transfer protocol is established.

3. The in-vehicle apparatus according to claim 1, wherein the interrupt event which indicates that the connection of the mail transfer protocol becomes interrupted at the time during the mail transfer under the concurrent connection with the cellular phone is stored by the control circuit as a result from answering an incoming voice call to the cellular phone.

\* \* \* \* \*